July 6, 1943.   D. F. HYLAND ET AL   2,323,538
APPARATUS FOR FITTING SHOES TO FEET
Filed July 8, 1940   8 Sheets-Sheet 8
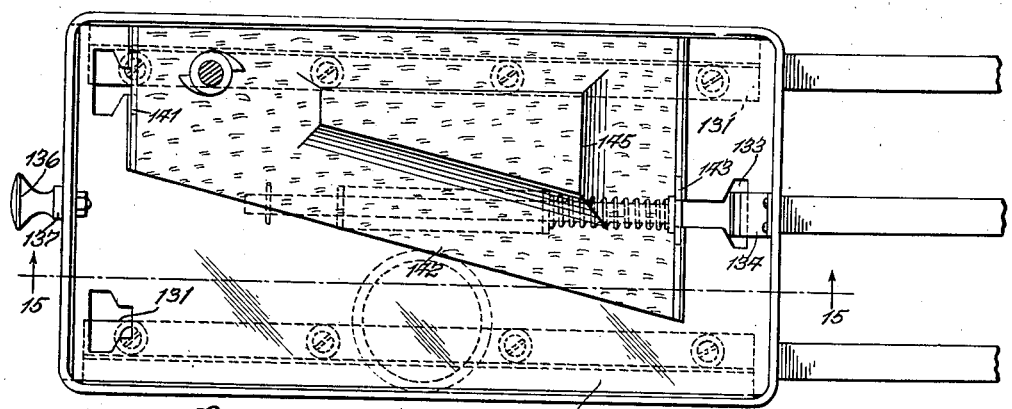
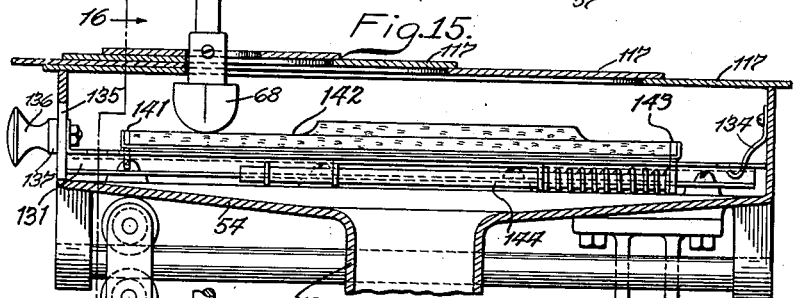
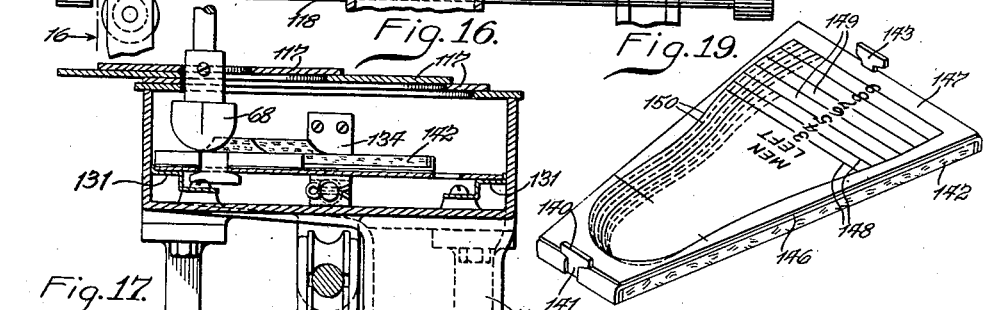
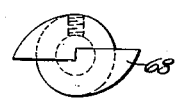
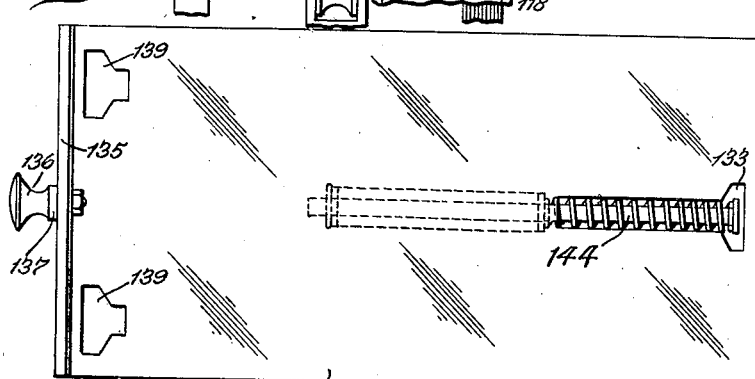
Inventors
Daniel F. Hyland
John C. Stiles
Hugo L. Brenner
John Brenner
by Buninga + Sutherland
Their Attorneys Patented July 6, 1943

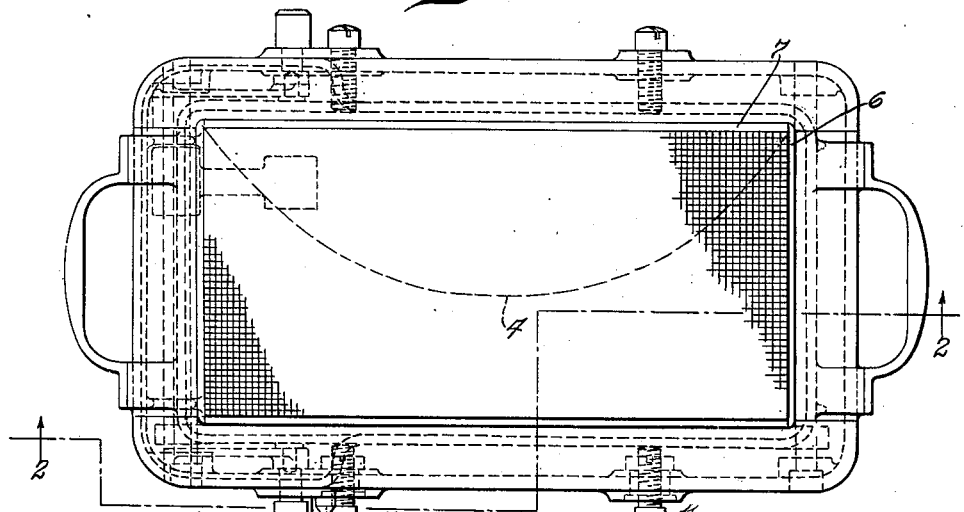
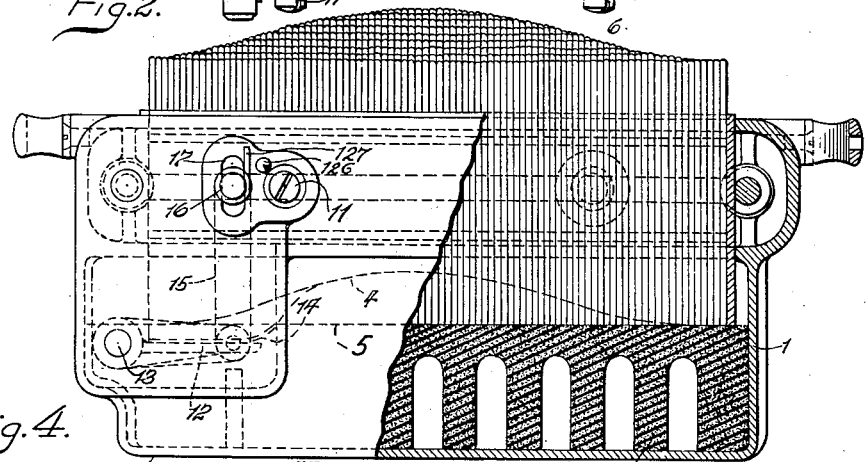
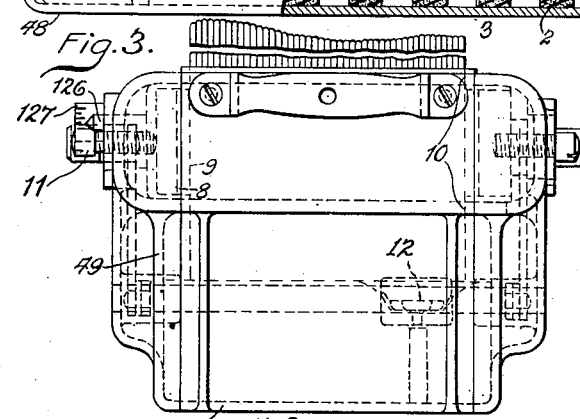
Inventors
Daniel F. Hyland
John C. Stiles
Hugo L. Brenner
John Brenner
Their Attorneys.

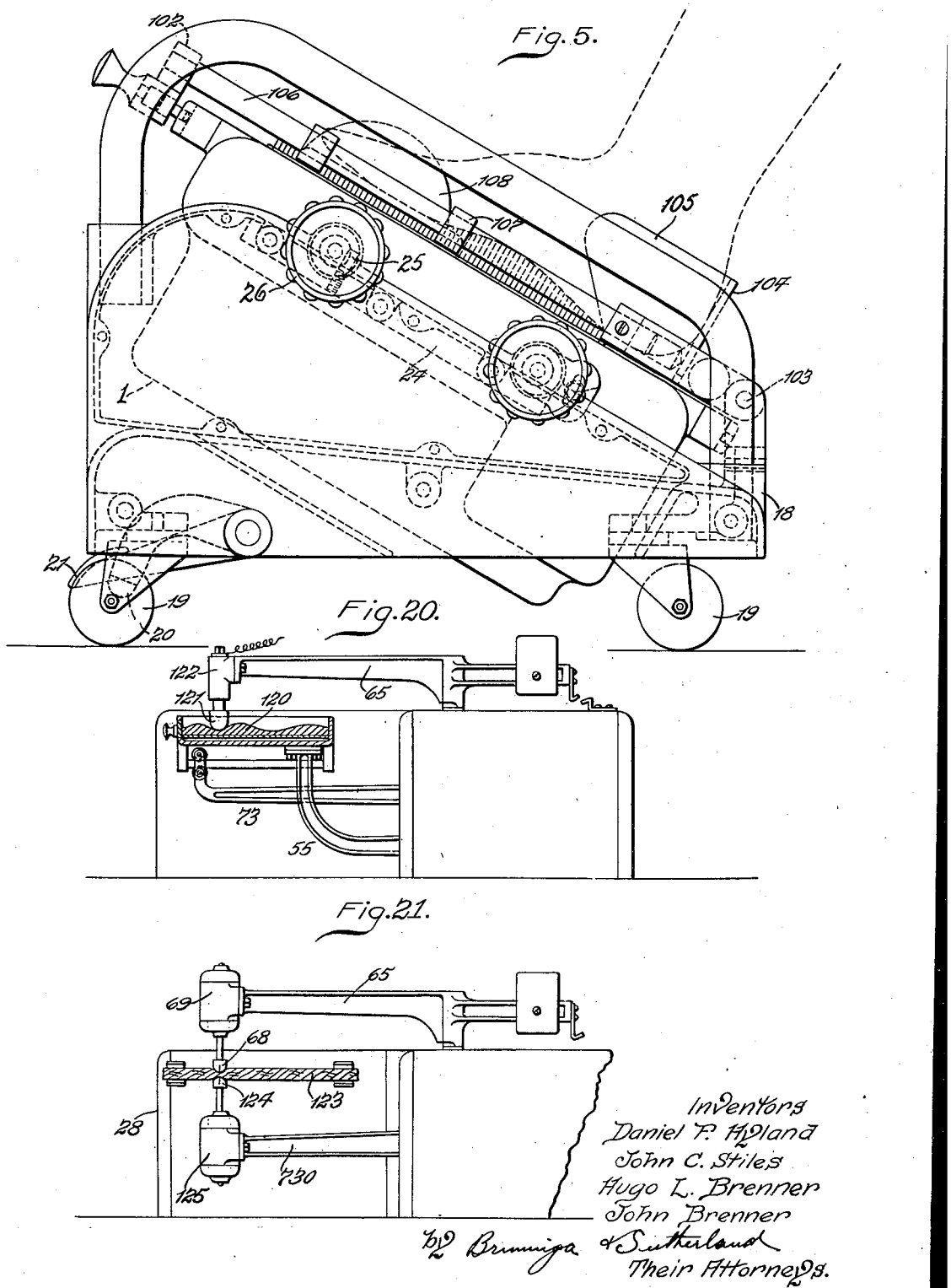

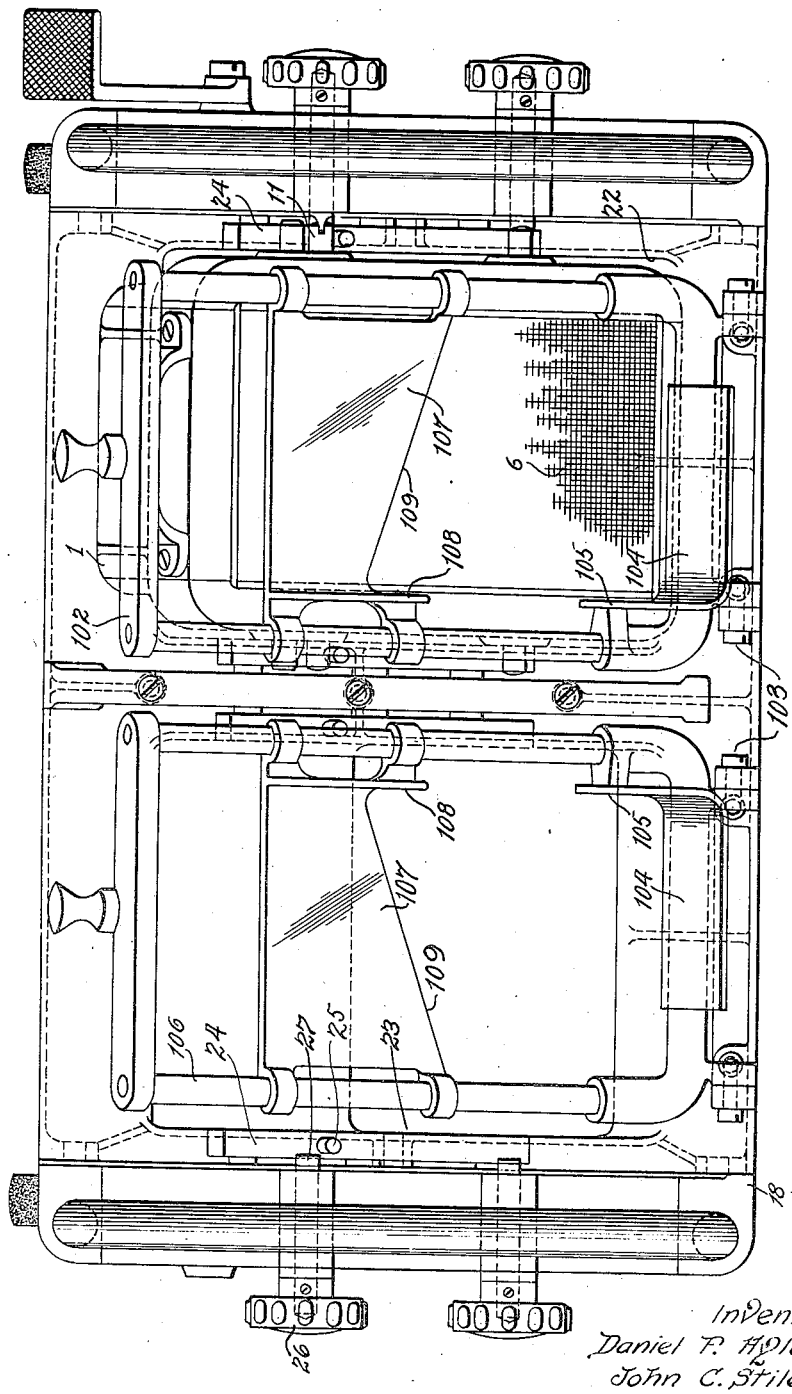

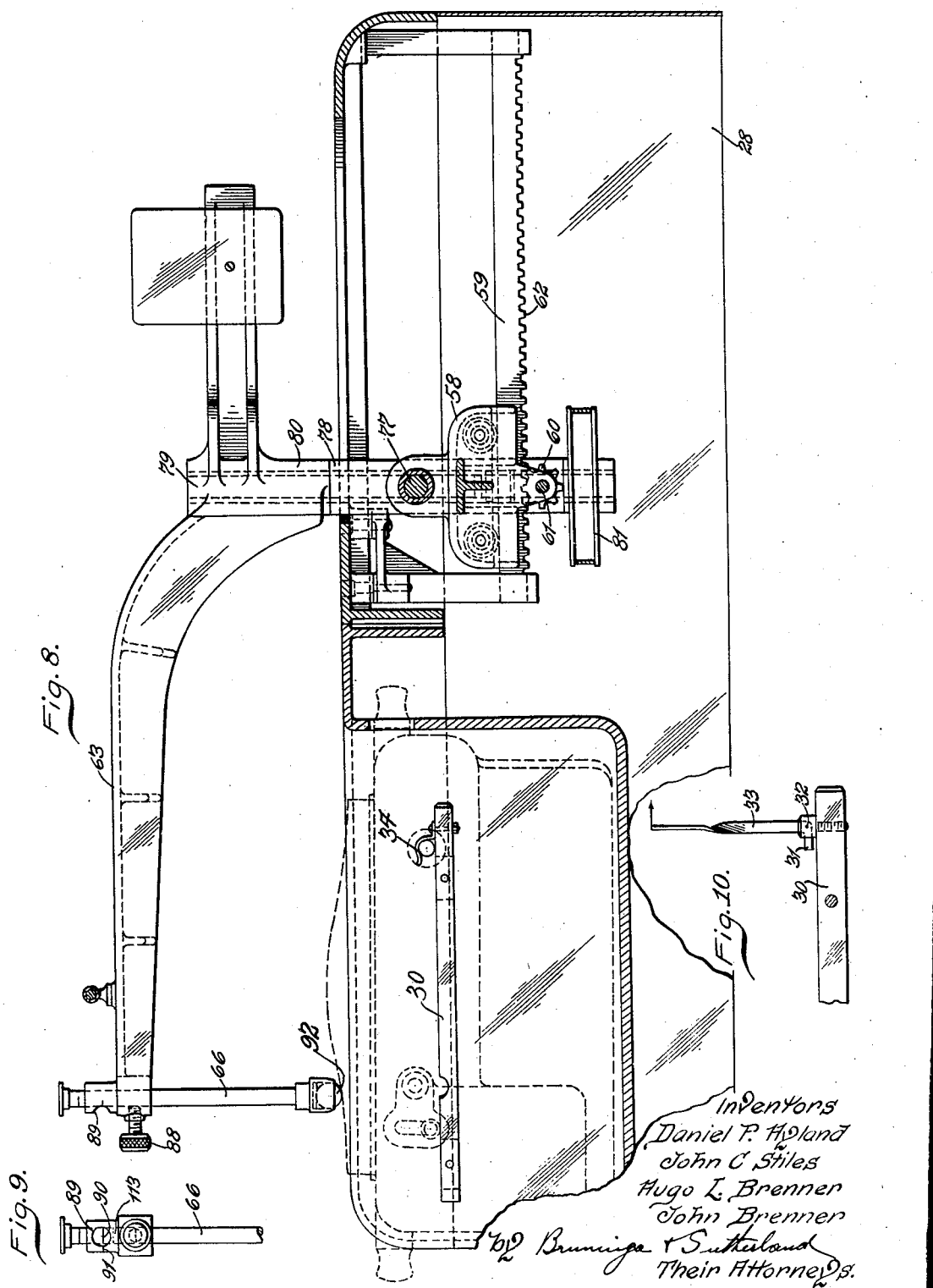

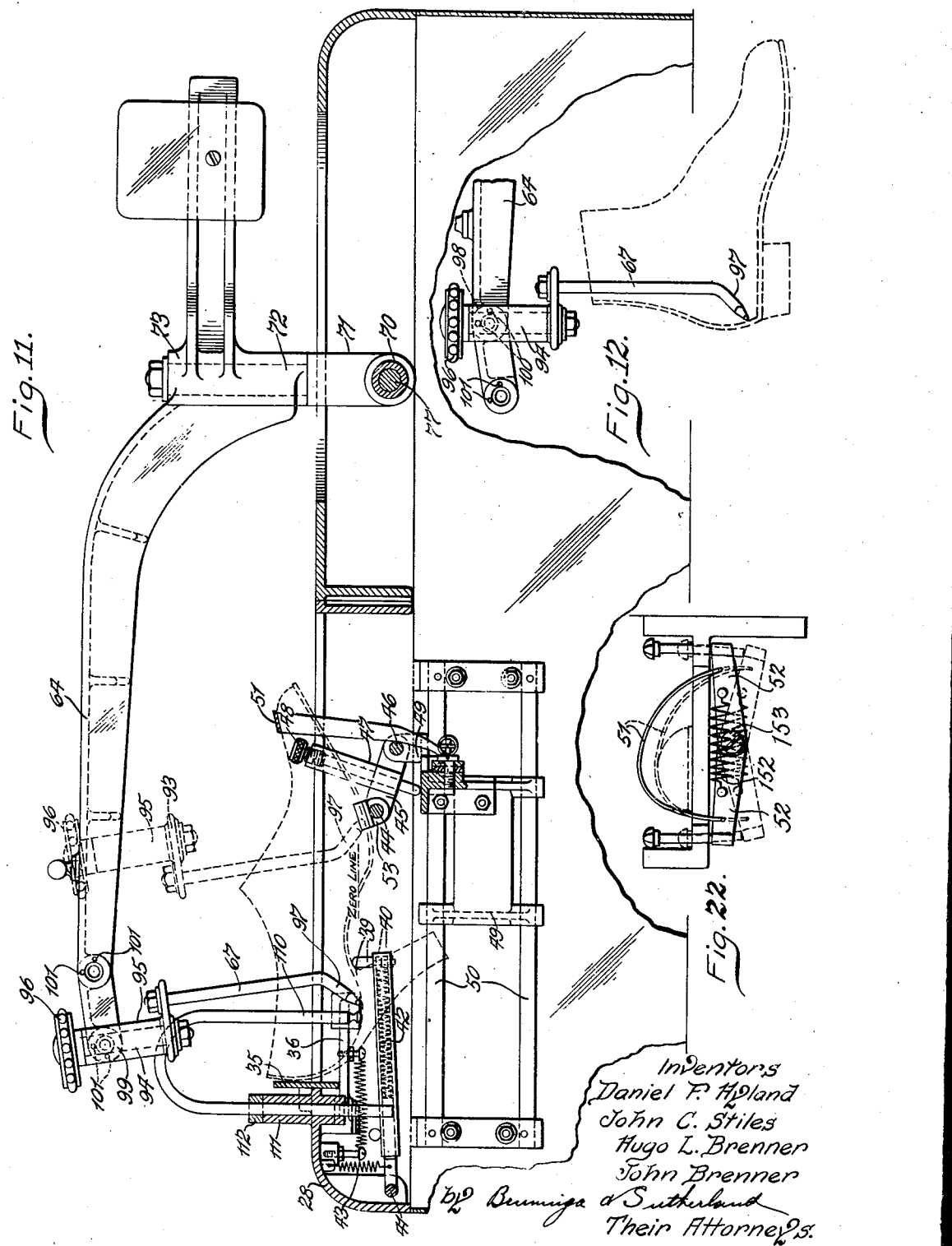

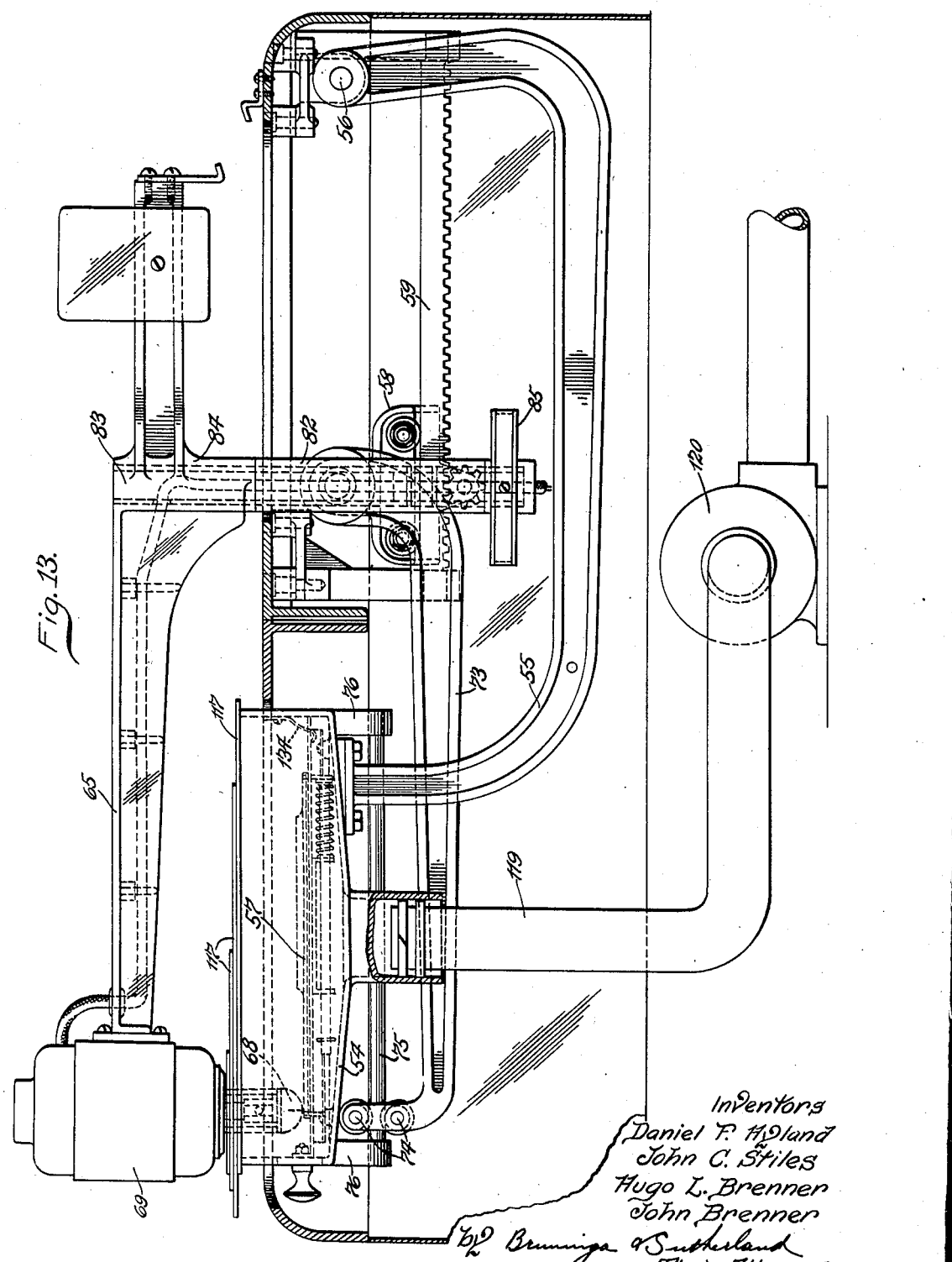

2,323,538

UNITED STATES PATENT OFFICE 2,323,538

APPARATUS FOR FITTING SHOES TO FEET

Daniel F. Hyland, John C. Stiles, Hugo L. Brenner, and John Brenner, St. Louis, Mo., assignors, by mesne assignments, to Arch-O-Graph Company, a corporation of Missouri Application July 8, 1940, Serial No. 344,458

17 Claims. (Cl. 12—60)

This invention relates to orthopedics and is concerned particularly with apparatus for fitting shoes to the feet of the wearer.

As is well-known, it is impossible to manufacture shoes on standard lasts and expect them to fit all human feet of that particular size with any degree of accuracy. No two pairs of feet are alike, and, in fact, it is very rare that a pair of feet are exact mates. There is so much variation in the shape of different feet of the same approximate size that it is the exception rather than the rule that a standard built shoe of the proper size is a perfect or even a comfortable fit.

The principal difficulty arises from the variation of the shape of the plantar surface of the foot. This surface is determined largely by the shape of the arch, and arches vary greatly in height and also in their lateral characteristics.

It is also true that shoes, even when manufactured to the same last, are by no means uniform in the shape of the foot supporting surface of the sole. And shoes of the same size made on different lasts vary from each other to a still greater extent. Accordingly, when such shoes are worn without correction, the foot must adjust itself to the shape of the shoe, and this often requires distortion of the normal position of the foot to such an extent as to cause serious discomfort.

One of the objects of this invention, therefore, is to provide means whereby a foot of any form may have fitted to it a shoe built upon any last and, particularly, shoes built upon standard lasts in the usual processes of manufacture.

Another object is to provide apparatus whereby a model may be taken off from the plantar surface of the foot and the lift formed by means accurately guided in accordance with the form of the model so formed and with the form of the inside sole surface of the shoe.

Another object is to provide apparatus whereby a lift may be formed by means operating upon both surfaces thereof and accurately guided in accordance with the form of the model and of the sole surface of the shoe, so as to produce a lift having a thickness at any point thereof corresponding to the difference at that point between the height of the model surface and the height of the inside sole surface of the shoe.

The invention thus brings a solution of the problem of accurately forming a lift so dimensioned as to occupy the space representing the difference between the foot and the shoe so as to support the foot in a normal position, whatever may be the form of the inside sole surface of the shoe.

Further objects will appear from the following description of one embodiment of the invention selected for illustration and explanation taken in connection with the accompanying drawings, in which:

Figure 1 is a plan view of the contour device for taking off the contour of the foot.

Figure 2 is a side view of the same.

Figure 3 is an end view of the same.

Figure 4 is a detail perspective view of one of the contour elements.

Figure 5 is an end view of the carrier in which the contour devices are mounted for taking the foot impression.

Figure 6 is a plan view of the same.

Figure 8 is a sectional view taken on about line 8—8 of Figure 7, showing the follower-arm and its relation to the contour device.

Figure 9 is a detail end view of a part of Figure 8.

Figure 10 is a detail view showing the temporary stop arrangement for setting the follower to its zero position.

Figure 11 is a sectional view taken about on line 11—11 of Figure 7 showing the stylus arm and its relation to the shoe.

Figure 12 is a detail of the stylus showing another position thereof.

Figure 13 is a section taken about on line 13—13 of Figure 7 showing the former arm and its relation to the blank.

Figure 14 is an enlarged plan view of the lift-blank table.

Figure 15 is a section taken on line 15—15 of Figure 14.

Figure 16 is a section on line 16—16 of Figure 15.

Figure 17 is a plan view of the blank holder.

Figure 18 is a detail end view of the cutter shown in Figures 15 and 16.

Figure 19 is a perspective view of the lift-blank.

Figure 20 is a view to a reduced scale similar to Figure 13, illustrating another embodiment of this invention.

Figure 21 is a view similar to Figure 20 illustrating still another embodiment of this invention, and Figure 22 is a detail of the shoe holder shown in Figure 11.

Figure 7:
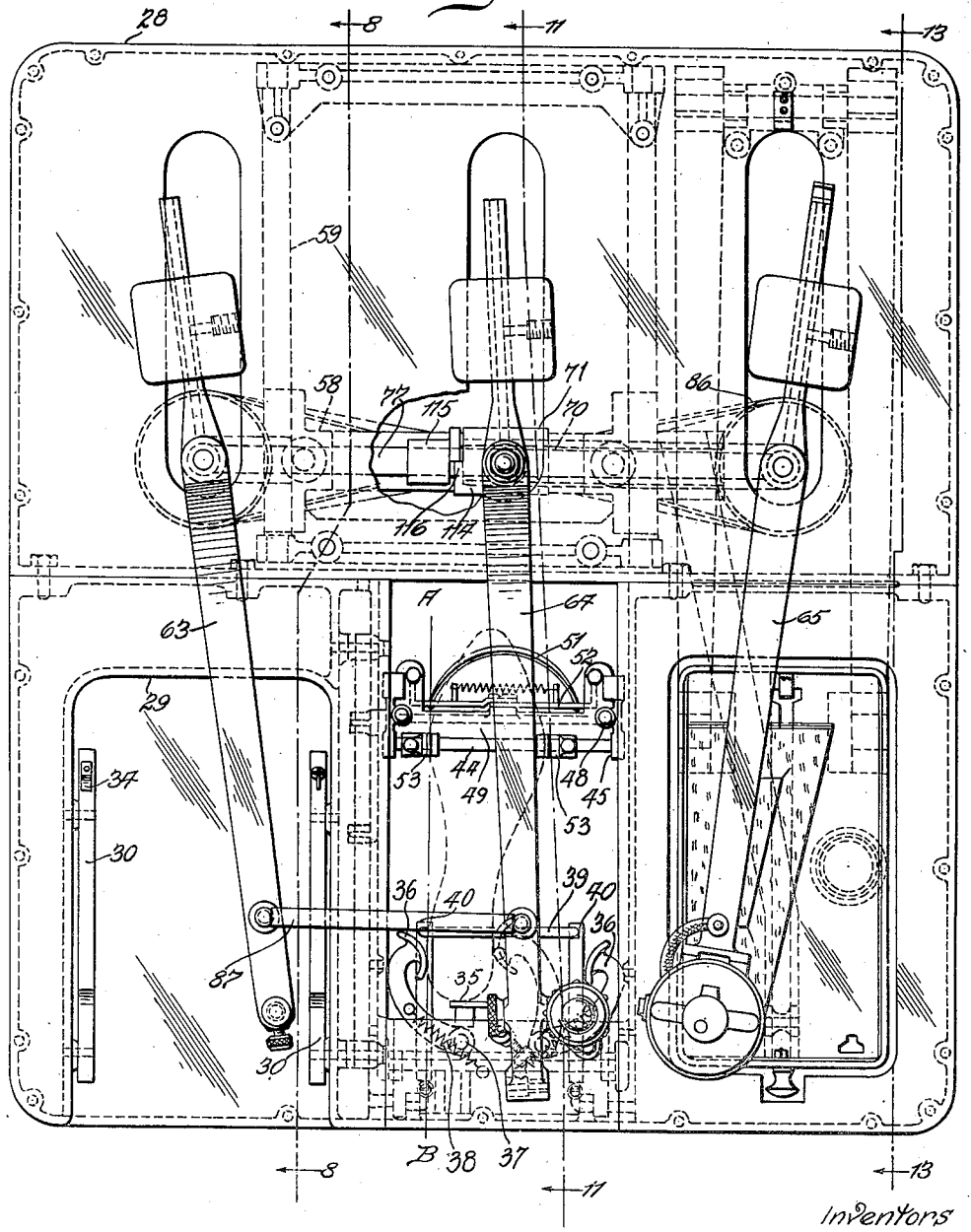
Figure 7 is a plan view of the apparatus for transferring the form set up on the contour devices and the inside sole surface of the shoe to the lift-blank to form the latter to correspond with the contour and the shoe surface.

In accordance with the process of this invention, a model is taken off the plantar surface of the foot, preferably in its normal position. This may be done by means of apparatus which will be described hereinafter, in which a series of shiftable elements are moved into engagement with the foot surface. This may be done by hand so that the degree of pressure applied in engaging the elements with the foot may be regulated with the necessary skill. When all these elements have been engaged with the foot surface, they are clamped in shifted position so as to form collectively a model of the foot surface. This model is then placed in suitable apparatus, an embodiment of which will also be described hereinafter. The shoe which is to be worn on the foot from which the model was taken is also placed in the machine in adjusted position. A lift blank is placed in a holder suitably related to the machine. One or more forming tools are then brought to operate upon the lift. Certain of these tools operate upon one surface of the lift blank, and these are guided by means of suitable mechanical connections, which will be described, in accordance with the shape of the model which has been taken from the foot surface. By this is meant that the movement of the tool is regulated to follow the contour of the model at every point of the lift face corresponding to a given point on the model, and, therefore, on the foot surface. By passing such a forming tool so guided over the complete face of the lift, the latter is formed to a shape corresponding to that of the model.

In accordance with this invention, the opposite face of the lift blank is also operated upon in accordance with the shape of the inside sole surface of the shoe. This operation may be a forming operation similar to that just described for the first surface. It has been found advantageous, however, instead of cutting or forming the opposite surface, to simply move this surface in accordance with the height of the inside sole surface of the shoe at each point thereof, so that instead of reproducing on the opposite surface the variations in the form of a shoe sole, these variations are superimposed upon those of the foot model, and the total variation is reproduced in the form of the first face of the lift. Accordingly, the total thickness of the resulting lift at any given point thereof will correspond to the difference at the corresponding point of the sole between the height of the model surface and the height of the inside sole surface of the shoe.

In this description and the appended claims, the term "height of the model," or model surface, refers to the height of that surface above any selected datum plane therebelow, and similarly the height of the sole surface of the shoe refers to the height of that surface above the same datum plane.

In accordance with this method, therefore, the blank may be formed by operating on one face thereof, say the upper face, by means of a cutting or forming tool which is raised and lowered in accordance with the height of the model surface, while at the same time the blank itself is raised and lowered in accordance with the height of the inside sole surface of the shoe; and by these operations the lift will be cut or formed, so that its thickness corresponds accurately to the difference between the foot sole and the shoe sole.

Referring more particularly to Figures 1 to 4, the contour device comprises a supporting frame in the form of a box 1, in the bottom of which may be mounted a resilient pad 2. This pad is preferably made very soft, so that it is easily compressed by the pressure of the foot while taking the impression. A type of pad which has been found satisfactory for this purpose is a pad usually constructed of sponge rubber which has been used for mattresses, seat cushions, and the like. However, the pads used for these purposes are usually a little too stiff. Accordingly, it is preferable to have such pads made up so as to provide greater yieldability.

The pad shown particularly in Figure 2 is of soft sponge rubber and provided with a series of perforations or recesses 3, usually extending upwardly thereinto from the bottom to a desired height. These are usually round holes which are spaced more or less regularly through the length and breadth of the pad. It has also been found desirable to form the pad with a portion of its top surface, indicated at 4, raised above the normal top surface of the pad, which is indicated at 5. This raised portion is given a contour approximating that of the hollow arch of a foot, but considerably larger, so that it will not only completely occupy the hollow part of the largest foot but will actually be compressed thereby. Mounted upright in the box 1 and so as to rest upon the top surfaces 4 and 5 of the pad 2 is a series of contour-forming elements 6. These elements may be of any desired form. It has, however, been found preferable to make them rectangular with their upper ends rounded off, as shown in Figure 4. It has been found convenient to form these elements with a square cross section at about one-eighth inch on the side and to assemble a great many of them in mutual contact with one another so as to fill the entire upper rim 7 of the box 1. When so assembled the upper ends of all these pins form a surface having the same contour as the upper surface of the pad 2. However, any element or group of elements may be depressed as by the pressure of a foot sole thereon against the resiliency of the pad 2, and when so depressed the upper ends will take the contour of the plantar surface of the foot.

Where the lift is intended for foot correction, as in cases of pronation, pads 2 of different degrees of stiffness may be provided so that the elements 6 may be applied to the sole under a pressure adjusted in accordance with the degree of correction desired.

Arranged along one side of the upper part of the box 1 is a movable abutment 8 which extends along the entire assembly of elements 6. This abutment may be faced with a slightly yielding facing 9 of cork or similar material, against which the elements 6 may be pressed. On the opposite side of the box the elements 6 may bear against shoulders 10 formed inside the box. The bar 8 may be forced against the assembly of contour elements by means of clamping screws 11. Accordingly, when the clamp screws 11 are tightened the entire mass of elements 6 is placed under pressure and clamped in whatever position the individual elements may be at the time. The yielding facing 9 provides that pressure may be applied to every row of elements so that all may be securely clamped. This provides, therefore, that when the impression of a foot sole has been made in the upper surface provided by the tops of all the elements or pins 6 the contour thereof may be fixed by clamping these elements by means of the screws 11.

In order to provide for establishing a certain standard of pressure to which the foot contour is to be taken, the box 1 has mounted therein a heel gauge 12 in the form of an arm pivoted at 13 and resting upon the top surface of the pad 2. If desired, a layer of fabric or leather 14 may be placed over the pad so as to provide a smooth change of contour at the end of the gauge. This gauge is connected by a link 15 with a pin 16 projecting through a slot 17 in the side of the box 1. This pin indicates the height of the gauge 12 and may be set to any suitable position along the slot 17 by adjusting the pressure of the heel upon the tops of the elements 6, which at this point rest upon the gauge 12. If desired, a suitable index 126 may be placed upon the box to cooperate with a scale 127 on the pin so as to indicate the desired position to which the pin 16 should be moved under pressure of the heel.

Figures 5 and 6 show a carrier 18 which may be provided with rollers 19 for moving it along the floor, and, if desired, a stop or brake 20 operated by a pedal 21. This carrier is provided with two compartments 22 and 23, each of which is arranged to accommodate one of the contour devices, such as shown in Figures 1 to 3. Each compartment is provided with a pair of rails 24 which may be set at an inclination, as shown in Figure 5 so as to position the top surface of the contour elements 6 in a convenient position for engagement by the feet to be fitted. Each contour device may be placed upon a pair of rails 24 by resting the heads of the screw 11 on said rails and against a suitable stop 25 which locates said screw heads each in a position to be engaged by a manipulating element 26 having its inner end 27 formed to engage the head of the screw 11 for operating the latter to clamp the contour elements. These devices 26 are arranged to slide in and out so that when the contour elements have been clamped the manipulating devices may be pulled out to release them from the screw heads and permit the contour devices to be lifted out of the carrier 18. When so removed from the carrier the contour devices will then be securely locked so as to retain a foot impression made therein.

When the foot impression has been taken, each of the contour devices in turn, together with the shoe to which the lift is to be fitted, are placed in the apparatus whose function is to transfer the contour of the foot sole from the contour device or model and the contour of the inside sole of the shoe to opposite faces of the lift-blank in order to form the latter to a variable thickness according to the difference between the foot sole and the shoe sole at every point thereof. The lift so formed may then be placed in the shoe and a perfect fit insured.

Referring now to Figures 7 to 13, inclusive, this apparatus is supported by and housed in a frame or casing 28. In the forward part of this apparatus, which is the lower part in Figure 7, there is provided a receiving opening or socket 29 to receive the contour device. Properly located within the opening 29 is a pair of rails 30 upon which the contour device may be supported by resting the heads of the screws 11 upon these rails in substantially the same manner in which the contour device was supported on the rails 24 of the carrier 18. One of the rails 30, in the illustrated embodiment the right hand rail in Figure 7, may be provided with a temporary stop 31 pivoted at 32 on a stud on the rail 30, as shown in Figure 10. This stop is provided with an elongated handle 33 by means of which it may be rocked in the direction indicated by the arrow in Figure 10 so as to elevate the stop 31 to move it out of the way of the screw 11. The purpose of this arrangement will be explained hereinafter. The other rail 30 may be provided with a permanent stop 34 formed to provide a spring catch adapted to grip and hold the screw head 11 when engaged therewith. The stop 31 is located so as to prevent the contour device being moved far enough back to be engaged in the catch 34. However, when the contour device has been set upon the rails 30 and moved back so as to be secured by the catch 34 it is in position for the operation of transferring its contour to the lift-blank.

In the forward middle portion of the apparatus shown in Figure 7 a shoe holder is provided. This is constructed so as to be capable of receiving and securing a shoe of any type or size in proper relation to the contour device mounted in the socket 29.

The shoe holder comprises a heel plate 35 against which the heel of the shoe is placed as indicated in Figures 7 and 11. A pair of side heel rests 36 is provided between which the heel of the shoe may be grasped. In Figure 7 the position of the shoe is indicated in dotted lines, a right shoe being indicated. For a right shoe the heel is moved against the left-hand side plate 36, as shown in Figure 7. These heel plates 36 are formed upon arms pivoted at 37 and tensioned by springs 38 to hold each arm either in its extreme side position, as shown by the left-hand plate in Figure 7, or in the position shown in dotted lines for the right-hand plate in Figure 7, where the spring 38 operates to press that side plate against the heel of the shoe to force the heel against the other side plate. By this arrangement the heel of the shoe is definitely located in its lateral position.

A horizontal heel support is provided in the form of a bar 39 supported upon a pair of arms 40 pivoted at 41 on the support 28. The arms 40 are partly hollow and have mounted therein springs 42, one of which is shown in Figure 11, tending to retract the bar 39 toward the front of the machine. The arms 40 are also resiliently supported by vertical springs 43. The bar 39 is adapted to support the heel of the shoe at a proper elevation when clamped between the side plates 36. The bar may be so placed as to bear against the bottom of an ordinary heel, or, in the case of a lady's high heel, it may be placed forwardly of the breast of the heel, as shown in Figure 11. Such a position is chosen as will place the average level of the inside sole surface of the shoe substantially in a horizontal plane.

The forward part of the shoe is arranged to rest upon a sole support in the form of a horizontal bar 44 arranged for vertical adjustment by being supported upon a pair of side arms 45 pivoted at 46 and each provided with an upright bracket 47 in which an adjusting screw 48 is threaded. The lower end of the screw 48 rests upon a bracket 49, which also carries the pivot 46 and which is slidable longitudinally of the frame 28 upon rails 50. By this arrangement the support 44 may be placed at any desired point along the shoe and raised to any desired elevation in order to level the average plane of the inside sole surface.

In the embodiment illustrated a toe strap 51 is provided which may be passed over the toe of the shoe to hold the same down upon the support 44. The ends of the strap 51 (Fig. 22) may be attached to a pair of arms 52 pivoted at 153 on the bracket 49 and is tensioned downwardly in any suitable manner, as by a spring 152. A pair of side stops 53 is also provided for the forward part of the shoe. These may be arranged to slide upon the bar 44 and to be clamped thereon so as to be adjustable to any size shoe. These stops are preferably arranged so that when in their extreme side positions they are so positioned as to locate properly the inside line of any right or left shoe, respectively. By inside line is meant a line joining the inside surfaces of the heel and toe, as indicated by the line A—B in Figure 7. This line is determined for right and left shoes, respectively, by the shoe engaging surfaces of the plate 36 and the stop 53 on the proper side when each is moved to its extreme position.

In the right-hand side of the apparatus, shown in Figure 7, means are provided for holding a lift-blank which is to be formed in accordance with the foot contour and the shoe contour. This supporting device is also illustrated in Figures 13 to 17, inclusive. A vertically movable table 54 is supported upon a pair of arms 55 pivoted at 56 in the extreme rear portion of the frame 28. This mounting permits the table 54 to swing vertically on the pivot 56, and as said pivot is located at a considerable distance from the table, the rise and fall will be practically a straight line movement with the forward portion of the table moving only slightly more than the rear portion. The means for imparting and controlling the vertical movement will be more fully explained hereinafter. A blank holder 57 is removably mounted upon the table 54, as will be more fully described presently.

The mechanism for transferring the contours of the model and the shoe sole to the blank is shown in Figures 7 to 13. A carriage 58 is arranged for longitudinal movement on the frame 28 by rolling upon rails 59. This movement is maintained in parallel relation by a pair of pinions 60 carried by a cross-shaft 61 suitably journaled in the carriage 58, said pinions meshing with racks 62 on the undersides of the rails 59, one of said racks being shown in Figure 8. Mounted on the carriage 58 for movement transversely of the frame 28 are three arms. For the sake of distinguishing between them in this description and the appended claims, these will be designated a follower-arm 63, a stylus arm 64, and a former arm 65. The arm 63 carries a follower 66 arranged for engagement with the contour or model set up in the contour device mounted in the socket 29. The arm 64 carries a stylus 67 arranged for engagement with the inside sole surface of a shoe in the shoe holder. The arm 65 carries a forming tool which in the embodiment illustrated is in the form of a rotary cutter 68 and having operating means in the form of a motor 69. The functions and operation of the follower 66 and the stylus 67 are very similar. They are called by these different names in this description for the purpose of distinguishing between them.

Suitably journaled in the carriage 58 is a hollow shaft 70. Mounted near the left-hand end, Figure 7, of the shaft 70 and keyed thereto is a bracket 71. This bracket carries an upright pivot shaft 72, upon which the hub 73 of the stylus arm 64 is pivoted (see Fig. 11). By this connection raising and lowering the arm 64 will rotate the hollow shaft 70. Mounted at the right-hand end, Figure 7, of the shaft 70 is an arm 73 extending forwardly beneath the table 54 (see Fig. 13). This arm carries at its end a pair of rollers 74 embracing a bar 75 mounted in end brackets 76 on the table 54.

Journaled within the hollow shaft 70 and at its left end, Figure 7, in the carriage 58 is a second shaft 77. Mounted on the left-hand end of the shaft 77 is a bracket 78. This bracket is also keyed to the shaft 77 so that rocking the bracket will rock the shaft. Journaled in the bracket 78 is a vertical shaft 79, to the upper end of which the hub 80 of the arm 63 is keyed. Accordingly, the arm 63 may swing transversely of the frame 28 on the shaft 79 as a pivot, and said shaft will be rocked by such transverse movement. The shaft 79 extends downwardly through the bracket 78 and carries at its lower end a pulley 81. In a similar manner the right-hand end, Figure 7, of the shaft 77 has keyed thereto a bracket 82 having journaled therein a vertical shaft 83, to the upper end of which the hub 84 of the arm 65 is keyed and the lower end of which extends below the bracket 82 and carries a pulley 85. The pulleys 81 and 85 are connected by a belt 86. This belt is preferably a steel band crossed between the pulleys 81 and 85 and secured to each of said pulleys against slippage relatively thereto. It will be seen that by these connections transverse swinging movement of the arm 63 will be communicated through the shaft 79 to the pulley 81 and from said pulley, by way of the belt 86, to the pulley 85 and thereby to the shaft 83 and the arm 65, causing a corresponding transverse swinging movement of the arm 65. Since the belt 86 is crossed between the pulleys 81 and 85, the movement of the arm 65 will be in reverse relation to that of the arm 63.

A link 87 connects the outer ends of the arms 63 and 64, said link having a universal joint, such as a ball and socket joint, at its connection to each arm so as to permit universal movement between the link and the arm. This link causes the arms 63 and 64 to move together for a purpose which will appear presently.

The follower 66 is mounted for vertical sliding adjustment in the end of the arm 63, and a thumb screw 88 is provided for fixing the same in its vertical adjustment. In the embodiment illustrated the forward portion of the arm 63 where the follower 66 passes therethrough is provided with a window 89 arranged to expose a short length of the follower 66, as will be seen in Figure 9. The follower may be provided with an index mark 90 which may be set by a similar index 91 at the side of the window 89. The lower end of the follower 66 may be provided with any suitable kind of tip so as to be capable of following accurately the contour set up on the model. In the arrangement illustrated a simple ball 92 is provided which may roll upon the model. The diameter of this ball may be so selected as to ride over the rounded tips of the elements 6 in such a way as to smooth out the surface generated by such movement.

The stylus 67 is arranged on the arm 64 so that its tip may be made to follow the inside sole surface of the shoe. The stylus itself is mounted by means of an offset arm 93 on the lower end of a vertical spindle 94 journaled in a bracket 95 which may be mounted in different ways upon the arm 64, as will be explained shortly. The upper end of the spindle 94 may be provided with suitable manipulating means such as a hand wheel 96. The lower end of the stylus 67 is bent over, as shown at 97, so as to bring its lower tip directly in line with the axis of the spindle 94. This arrangement provides that the stylus may be moved about by rotating the spindle 94 in such a manner as to clear obstructions while maintaining the tip of the stylus in alignment with the axis. A particular use of this arrangement is illustrated in Figure 12 where the stylus is shown in use with a high shoe, and the bent tip makes it possible to gauge the sole surface clear up to the back of the heel. The arm 64 is provided with two points at which the stylus may be mounted. In the arrangement of Figure 12 the bracket 95 is mounted upon a boss 98 formed somewhat in rear of the end of the arm 64, while in the arrangement shown in Figure 11 the bracket 95 is mounted on another boss 99 formed at or near the end of the arm 64. The position of the bracket 95 is different in the two mountings. A pair of pins 100 formed on the bracket 95 are arranged to be inserted in corresponding sockets 101 in the bosses 98 and 99. The location of these sockets may be different in the two bosses so that the stylus is held in upright position in Figure 12 and in an inclined position in Figure 11. These bosses may be so adjusted as to enable the tip of the stylus to reach all parts of the shoe sole which must be gauged.

The arrangements for mounting the lift-blank in the holders 57, 54 are shown more particularly in the Figures 14 to 17, inclusive. The table 54 comprises generally the form of a shallow pan provided on the inside thereof with side rails 131 adapted to receive and locate the blank-supporting plate or holder 57. This plate may be removably fitted into the pan 54. For this purpose the plate may be provided at one end with a perforation 133 engageable by a retaining spring 134 within the pan 54. The front end of the plate is turned upwardly and provided with a vertical flange 135, fitting into an opening in the front wall of the pan 54. Mounted on the flange 135 is a handle 136, the side extending flange portions being adapted to engage the front ends of the rails 131. This secures the plate against the tension of the spring 134.

The plate is provided at its front end with a pair of perforations 139, having a sort of keyhole shape adapted to receive a downwardly extending key 140 on a holding bar 141, which is engaged under a facing 146 on the top side of the lift-blank 142 with the key 140 projecting downwardly through an opening in the facing. A similar key 143, similarly mounted on the opposite end of the lift blank, is passed through the perforation 133 and engaged by a spring tension bar 144, as shown in Figure 15, so as to secure the lift-blank in place in the holder, and, at the same time, tension the same lengthwise so as to keep it flat.

The lift-blank may be formed as illustrated in Figures 14 and 19. Figure 14 shows a plan view of what is the upper surface of the blank while being operated upon, but which, according to the method of this invention, becomes the under-surface when the lift is applied to the shoe. Figure 19 shows the opposite surface to that of Figure 14. Figure 19 shows that this surface is substantially flat, while the surface operated upon, as shown in Figure 14, may have an elevated portion 145 located at that part of the blank which must usually be formed higher.

As shown in Figure 19, the flat side of the blank may be provided with a suitable finished surface, such as the facing or sock lining 146 of fabric, leather, or the like, so that when the opposite face of the blank has been formed and the same is inverted and placed in a shoe, this surface will be uppermost and will provide a finished surface for the inside of the shoe. In addition to the sock lining 146, a chart 147 may be applied to the blank in any suitable manner. This chart has provided on a diagram the outlines to which the lift is to be trimmed for several different sizes of shoes. As shown at 148, the designations of the different shoe sizes are given so as to indicate to the operator the point at which the lift is to terminate for the respective sizes. At 149 are given designations of sizes, and along the outside of the foot is a series of outlines 150 to which the lift may be trimmed. Accordingly, this chart serves as a guide to the operator by means of which he may quickly trim the finished lift to the proper shoe to be fitted. As this is usually done after the lift has been formed, the thickness of the lift along the outline to be trimmed is usually very small and the trimming operation is therefore easily and quickly performed with the aid of these lines. The chart 147 may be removably attached to the blank, as, for instance, by securing it adhesively at one or both ends, preferably beyond the limits of the diagram so that the secured portions are eventually trimmed off. This diagram may also be placed directly on the sock lining, in which case it will usually remain on the lift after it is finished.

The table or pan 54 is so positioned that the forming tool 68 will operate within the side flanges thereof, and in order to prevent the cuttings from being scattered about one or more closure plates 117 may be placed upon the top edges of said flanges. In the arrangement illustrated in Figures 15 and 16 a series of such plates is employed, each having a perforation through which the forming tool may be inserted, but the perforations in the successive sheets being of different sizes. The lower sheet has a large perforation which permits the forming tool to move over the greater portion of the area of the blank without requiring shifting of the plate except when the tool moves to the extreme limits of that area. The succeeding plate, resting upon the first plate, is large enough to cover the perforation in the first plate and is itself provided with a smaller perforation such that the tool may move about and within without shifting the second plate except when near the edges, and then the shift will not be sufficient to uncover the perforation in the lower plate. Thus, each succeeding plate has a smaller opening and covers the opening in the one below it. By this arrangement the forming tool may be moved over the entire area of the blank and still the pan 54 will remain covered so that the cuttings are not thrown about.

In order to carry away the cuttings, the lower portion of the pan 54 may be formed into a spout 118 into which extends the open upper end of an exhaust pipe 119 connected to a suction blower 120, which carries off the cuttings for disposal in any suitable manner. The arrangement is such that the pan 54 may rise and fall, as previously described, and still maintain its connection with the exhaust pipe 119.

In the operation of this apparatus, in order to fit a pair of shoes to the feet of the wearer in accordance with the method of this invention, two of the contour devices or models shown in Figures 1 to 3 are mounted in the carrier 18, as shown in Figures 5 and 6. This carrier is further provided for cooperation with each of the contour devices with a frame 102 pivoted at 103 on the carrier. The frame is provided at its lower portion with a rear heel plate 104 and a side heel plate 105 against which the heel of the foot is placed for proper alignment. The side plate 105 is on the inside of the foot. The frame 102 is provided with longitudinal side bars 106, upon which is slidably mounted a sole plate 107 adapted to provide a rest for the ball of the foot. The plate 107 is also provided with a side plate 108 on the inside of the foot. The plate 107 is preferably provided with an angular edge 109 running about at the angle of the ball of the foot. This plate depresses the elements 6 below it to a given level which is fixed for a given apparatus. This may be deemed the zero level. The foot is now placed upon the contour device with the inside surface thereof against the plates 105 and 108 and the heel against the plate 104 with the sole at the ball of the foot resting upon the plate 107. The position of the foot is indicated approximately in dotted lines in Figure 5. The operator may first adjust the position of the carrier 18 with respect to the subject by rolling it forward or back until the desired position of the foot with respect to the leg is obtained. The subject is then required to put enough pressure on the feet to depress the heel plate 12 and bring the pin 16 to a desired level. An index mark may be placed on the frame 1 to indicate approximately the desired level. When this position has been obtained and the operator is satisfied that the feet are in normal position for that subject and for the purpose for which the lift is intended, the manipulating elements 27 are pushed into engagement with the screw heads 11 and operated so as to cause said screws to clamp the elements 6 in the position given them by the pressure of the foot. This may be done for both feet simultaneously, as it is often easier to obtain a normal position of the foot when the subject places both feet simultaneously upon two separate contour devices. When these devices have been securely clamped, they are removed one at a time from the carrier 18 and placed in the socket 29 of the apparatus shown in Figure 7.

Each lift-blank is formed separate in the machine illustrated, as will now be described. One of the contour devices or models, say of the right foot, is now placed in the socket 29 on the rails 30 and pushed rearwardly until arrested by the stop 31, as already described. The shoe to be fitted to the right foot is then placed in the shoe holder. After the shoe has been inserted in the holder a heel stop 110 is put in place. This stop in the embodiment shown is in the form of an inverted U-shaped bar slidably fitted into a standard 111 on the frame 28 and located by a collar 112 which is adjustable along the forward leg of the U-shaped bar 110. When the collar 112 has been set and positioned to rest upon the stop of the standard 111, the lower end of the heel stop 110 will be brought against the inside surface of the heel of the shoe so as to depress that surface to a given datum level, the support 39 yielding for that purpose. The sole of the shoe is arranged to rest upon the pair of stops 53, adjustable upon the bar 44, as already described. The stylus 67 is now moved to a point on the inside of the shoe sole corresponding approximately to a point on the foot which was placed in engagement with the plate 107 when the impression was taken. It will be remembered that this plate set the elements therebelow to a zero level. When the stylus 67 is placed in this position on the shoe sole, the follower 66 will be carried back so as to engage the model at a point where this zero level has been set into the elements 6. The temporary stop 31 is used for the purpose of setting the model forward during this operation sufficiently to insure that the follower 66 will engage the model at a point beyond the impression of the edge 109 so as to be certain to work on this zero level of the model. Now with the stylus resting upon the shoe sole at this point, the follower 66 is adjusted in the arm 63 to bring the mark 90 opposite the index 91. If at this point either the ball 92 is out of contact with the model, or the tip of the stylus is out of contact with the shoe sole, the sole support 44 is raised or lowered by adjustment of the screw 48 until both of these elements are in proper engagement; that is, the ball 92 rests upon the model and the tip of the stylus 67 contacts the inside of the shoe sole at the ball of the foot. This adjustment having been obtained, the stop 31 is moved out of the way by pushing back the handle 33 and the model is then pushed back against the stop 34 so as to be held in place thereby. The adjustment just described has now brought the model and the shoe sole to the same level at the ball of the foot. However, since in taking the impression the ball of the foot was placed upon the top of the plate 107 while the element 6 engaged the bottom of that plate, a correction must be made for the thickness of said plate. This may be done by placing a second index mark 113 on the follower 66 spaced from the mark 90 by the thickness of the plate 107. After the foregoing adjustment has been made therefor, the follower 66 may be moved up until the mark 113 is placed opposite the mark 91 and fixed in this position.

The shoe and the model having been placed in proper relation to each other, a lift-blank is placed in the holder 57 and adjusted on the table 54. The operation of the forming tool 68 may now be started by starting the motor 69. This tool is arranged to cut or otherwise form the lift-blank so as to bring the height of its top surface, as it is placed in the holder, to a level corresponding to that of the model at the point where the ball 92 engages the latter. As will be seen from Figure 7, the operator may now manipulate the stylus 67 so as to pass its tip successively over every point of the inside sole surface of the shoe from the ball of the foot clear back to the rear of the heel. In so doing, the operator may, for instance, start at the ball of the foot and move the stylus laterally back and forth across the shoe sole. The movement of the stylus to the ball of the foot pushes the carriage 58 rearwardly to a corresponding position which carries with it the arms 63 and 65 to corresponding points upon the model and the lift-blank, respectively. The sidewise movement back and forth of the stylus over the shoe sole causes a corresponding swinging movement of the arms 63 and 65 so as to carry them respectively back and forth across the model and the lift-blank. It will be noted that the arm 63 swings in the same direction as the arm 64, while the arm 65 moves in reverse relation to the stylus arm 64. The reason for this is that the blank is placed in inverted position in the blank holder so that its right and left sides are in reverse relation to those of the shoe. It is in fact the bottom surface of the lift-blank that is operated upon by the forming tool 68. Accordingly, as the stylus is swung from right to left across the shoe sole, the forming tool moves from left to right across the lift-blank.

The effect of this operation is to form on the lift-blank a perverted copy of the model surface; that is, the shape of the blank is reversed as to right and left, with respect to the model, but not as to top and bottom, the relation being similar to that of an object to its image in a plane mirror lying in a vertical plane parallel to the longitudinal axis of the model. When formed in this way the lift, upon being inverted to bring the sock lining to the top, will be in proper relation to the foot modeled to be placed in the shoe.

As the follower 66 is moved back and forth across the model in accordance with the operation of the stylus, the difference in elevation of different parts of the model will cause the arm 63 to rise and fall. This up-and-down movement is communicated by the chain of connections already described, including the shaft 71, to the arm 65, which rises and falls in accordance with the rise and fall of the arm 63. Accordingly, the forming tool will operate upon the blank and would form its top surface (as placed in the holder) to a contour like that of the model but in reverse relation thereto as concerns right and left, if there were no vertical movement of the blank.

As the stylus moves over the sole of the shoe it is also subjected to a vertical movement in accordance with the difference in level of different points of the inside sole surface. This up-and-down movement of the arm 64 is communicated through the hollow shaft 70 and its associated connections to the arm 73, which causes the blank holder to rise and fall accordingly. It will be seen, therefore, that the thickness of the lift is formed to the difference between the height of the model and the height of the inside sole surface of the shoe. In order to insure against the table 54 being moved high enough at any point so that the cutter 68 will cut clear through the blank a stop device is provided. In the embodiment illustrated, this takes the form of a sleeve 114 on the hollow shaft 70 and a complementary sleeve 115 on the shaft 77. These sleeves have mutually engaging shoulders indicated at 116, which are adjusted to come into engagement when the forming tool 68 approaches to within a fixed minimum distance of the blank holder. This minimum distance may in most cases be the thickness of the fabric or leather facing or sock lining 146 on the blank.

It will be seen, therefore, that by this operation the lift is formed with its bottom surface (that is, the surface turned uppermost in the holder) formed to a contour corresponding to that of the sole of the foot as set up in the model or contour device. At the same time, the lower surface of the blank as it is mounted in the holder is operated upon in accordance with the contour of the inside sole surface of the shoe. In this case, however, instead of cutting or forming this lower surface, it is simply raised and lowered so that the entire forming operation is performed differentially by the forming tool 68. As a result a lift is formed whose thickness at any point is the difference between the height of the sole of the foot and that of the inside sole of the shoe. When this forming operation has been completed, the blank may be removed from the holder and trimmed along the outlines shown in Figure 19 in accordance with the shoe size so as to fit the shoe. The chart 147 may now be removed and the lift placed in the shoe with its formed surface down against the inside sole of the shoe and may, if desired, be adhesively secured therein. Of course, when the lift has been completed for one shoe, the other contour device is set in the socket 29 and another lift formed for the other shoe in the same manner.

In Figures 20 and 21 are shown modified forms of apparatus capable of carrying out the general method of this invention in different specific ways. In Figure 20 the lift-blank takes the form of a plastic material 120. This material may be such as to be formable, either by heat or by pressure, and the forming tool may take a suitable form adapted to the purpose. In Figure 20 the forming tool 121 is illustrated as a heating tool adapted to form the lift by heat and pressure. This may be provided with operating means therefor such as a heating coil 122. The operation of forming the lift is the same in this case as has already been described. The shaping of the lift, however, takes place thermo-plastically instead of by a cutting operation.

In Figure 21 the bottom surface of the lift-blank as placed in the holder is operated upon by a forming tool instead of simply by being raised and lowered. In this case the blank 123 may be suspended in any suitably manner so as to render both upper and lower surfaces thereof accessible to the forming tools. The upper surface may be operated upon by a cutting tool such as 68 operated by a motor 69, as already described. In this case, however, an arm 730, corresponding to the arm 73 described above, carries a forming tool 124 illustrated in Figure 21 as a cutter operated by a motor 125. In this case, also, in place of the cutter forming tools such as 121 may be employed for forming either or both top and bottom surfaces.

Figures 20 and 21 are more or less diagrammatic and are intended to illustrate the method rather than the details of the apparatus in each case.

While the invention has been described above as applied to a unitary machine, it will be understood that individual features or subcombinations thereof may be useful by themselves without reference to other features or the complete combination, and the employment of such individual features or subcombinations is contemplated by this invention when within the scope of the appended claims.

It is further obvious that various changes may be made in the details of construction or procedure, within the scope of the appended claims, without departing from the spirit of this invention, and that the invention is not limited to the specific details shown or described.

Having thus described the invention, what is claimed is:

1. In an apparatus of the character described for fitting shoes to feet, means for positioning a foot model, means for positioning a shoe, means for holding a lift-blank, and means operating on both faces of the lift-blank guided respectively by the model and the inside sole surface of the shoe to form the lift to a thickness at any point thereof corresponding to the difference between the height of the model and the height of the sole surface of the shoe at the corresponding point.

2. In an apparatus of the character described for fitting shoes to feet, means for positioning a foot model, means for positioning a shoe, means for holding a lift-blank, and means operating on both faces of the lift-blank having take-off means engaging the model and the inside sole surface of the shoe respectively and controlled by said take-off means to operate on said respective faces in accordance with the shapes of the model and the shoe sole surface.

3. In an apparatus of the character described for fitting shoes to feet, means for positioning a foot model, means for positioning a shoe, means for holding a lift-blank, and means operating on both faces of the lift-blank having take-off means engaging the model and the inside sole surface of the shoe respectively and controlled by said take-off means to operate on one of said faces by positioning the same in accordance with the height of the surface of one of said model or shoe sole and on the other of said faces by forming the blank in accordance with the height of the surface of the other of said model or shoe sole.

4. In an apparatus of the character described for fitting shoes to feet, means for positioning a foot model, means for positioning a shoe, holding means for holding a lift-blank, forming means operable to form the blank, said holding and forming means being mounted for relative movement, and control means engageable with the model and the shoe and connected to determine the relative positions of the blank and said forming means in accordance with the difference between the height of the model surface and the inside sole surface of the shoe.

5. In an apparatus of the character described for fitting shoes to feet, means for positioning a foot model, means for positioning a shoe, movable means for holding a lift-blank, movable forming means operable to form said blank, and control means positioned by the model and the shoe to control the relative positions of said forming means and said holding means in order to form the lift to a thickness at any point thereof corresponding to the difference at that point between the height of the model surface and the height of the inner sole of the shoe.

6. In an apparatus of the character described for fitting shoes to feet, means for positioning a foot model, means for positioning a shoe, movable means for holding a lift-blank, movable forming means operable to form said blank, control means engageable with the model to be guided thereby and connected to control the movement of said forming means relative to the blank, and control means engageable with the inside sole of the shoe to be positioned thereby and connected to position said blank-holding means.

7. In an apparatus of the character described for fitting shoes to feet, means for positioning a foot model, means for positioning a shoe, holding means for holding a lift-blank, forming means operable to form the blank, said holding and forming means being mounted for relative movement, control means engageable with the model and the shoe and connected to determine the relative positions of the blank and said forming means in accordance with the difference between the height of the model surface and the inside sole surface of the shoe, and stop means limiting the mutual approach of said holding means and said forming means so as to preserve a minimum thickness of the lift.

8. In an apparatus of the character described having shoe-holding means and lift-blank holding means, a longitudinally-movable carriage, a transversely and vertically-movable follower-arm on said carriage cooperatively related with said shoe-holding means, vertically movable supporting means for said blank-holding means, and connections between said follower-arm and said supporting means operating to raise and lower said supporting means in accordance with the rise and fall of said follower-arm.

9. In an apparatus of the character described, a supporting frame, means on said frame to receive and position a contour device, a shoe holder on said frame, a lift-blank holder movably mounted on said frame, a carriage longitudinally movable on said frame, a follower-arm transversely movable on said carriage having a follower extending in cooperative relation with the contour device, a stylus arm transversely movable on said carriage having a stylus extending in cooperative relation with a shoe in said shoe holder, a former arm transversely movable on said carriage having a forming tool extending in cooperative relation with a blank in said blank holder, connections between said follower and stylus arms constraining them to perform like transverse movements, reversing connections between said follower and stylus arms and said former arm constraining the latter to perform transverse movements like those of said follower and stylus arms but in the reverse direction, a train of connections between said follower arm and said former arm operating to raise and lower said former arm in accordance with the rise and fall of said follower arm, a second train of connections between said stylus arm and said blank holder operating to raise and lower said blank holder in accordance with the rise and fall of said stylus arm, and means for operating said forming tool.

10. In an apparatus of the character described, a blank holder comprising, a substantially flat blank support, anchorage means for a blank at one end thereof, and tensioned means engageable with the blank to tension the same against said anchorage.

11. In an apparatus of the character described, a blank holder comprising, a substantially flat blank support having a portion engageable with locating means on the apparatus, and anchorage means on said support constructed and arranged to hold a blank in tension thereon.

12. In an apparatus of the character described, a blank holder comprising, a substantially flat blank support having anchorage means engageable respectively with right-hand or left-hand blanks, and tensioning means engageable with either right-hand or left-hand blanks and operating to tension the same against said anchorage means.

13. Lift-forming apparatus of the character described, comprising, means for positioning a foot model, means for positioning a shoe, holding means for holding a lift-blank, take-off elements engageable with the model and the shoe to follow the contour thereof, forming means operable to form the blank, and transmission mechanism operating differentially to consolidate the movements of said respective take-off elements to determine the relative positions of the blank and said forming means.

14. Lift-forming apparatus of the character described, comprising, means for positioning a foot model, means for positioning a shoe, holding means for holding a lift-blank, take-off elements engageable with the model and the shoe to follow the contour thereof, forming means operable to form the blank, and mechanism connected to said take-off elements in differental relation and organized to consolidate the movements thereof to determine the relative positions of the blank and said forming means.

15. Lift-forming apparatus of the character described, comprising, means for positioning a foot model, means for positioning a shoe, holding means for holding a lift blank, take-off elements engageable with the model and the shoe to follow the contour thereof, forming means operable to form the blank, and transmission mechanism connecting said take-off elements with said forming means to determine the relative positions of the blank and said forming means, said mechanism operating differentially to consolidate those movements of said take-off elements determining the thickness of the formed blank and perversively to control the lateral position of the forming means relative to the blank.

16. Lift-forming apparatus of the character described, comprising, means for positioning a foot model, lift-blank-holding means, a longitudinally movable carriage, an arm rockable on said carriage and pivoted thereon for lateral swinging movement, said arm having a follower engageable with the foot-formed surface of said modeling means, a second arm mounted on said carriage to rock with said first arm and pivoted for lateral swinging movement on said carriage, connections to transmit swinging movement from said first arm to said second arm, and forming means on said second arm engageable with a blank on said holding means.

17. Lift-forming apparatus of the character described, comprising, means for positioning a foot model, lift-blank-holding means, a longitudinally movable carriage, a shaft journaled on said carriage, a plurality of arms secured to said shaft to rock together thereon, said arms being pivoted for lateral movement relative to said shaft, connections transmitting swinging movement on its pivot from one of said arms to another, follower means on one of said arms engageable with a foot-formed surface of the model, and lift-forming means on another of said arms.

DANIEL F. HYLAND.
JOHN C. STILES.
HUGO L. BRENNER.
JOHN BRENNER.